United States Patent [19]

Gardner et al.

[11] Patent Number: 4,551,295

[45] Date of Patent: Nov. 5, 1985

[54] PROCESS FOR MIXING AND EXTRUDING CERAMIC MATERIALS

[75] Inventors: Robert W. Gardner, Big Flats; Donald L. Guile, Horseheads; Merrill Lynn, Big Flats, all of N.Y.

[73] Assignee: Corning Glass Works, Corning, N.Y.

[21] Appl. No.: 604,374

[22] Filed: Apr. 26, 1984

[51] Int. Cl.⁴ .............................................. B29B 1/10
[52] U.S. Cl. .................................. 264/177 R; 264/60; 264/209.8; 264/323; 425/204
[58] Field of Search ...................... 264/177 R, 60, 323, 264/209.8; 425/204

[56] References Cited

U.S. PATENT DOCUMENTS

| | | | |
|---|---|---|---|
| 3,917,782 | 11/1975 | Holcombe et al. | 264/60 |
| 4,411,856 | 10/1983 | Montierth | 264/60 |
| 4,428,758 | 1/1984 | Montierth | 264/60 |
| 4,432,918 | 2/1984 | Paisley | 264/60 |

Primary Examiner—Jeffery Thurlow
Attorney, Agent, or Firm—C. S. Janes, Jr.

[57] ABSTRACT

This invention is directed to the making of ceramic articles through extrusion utilizing a self-cleaning, intermeshing, co-rotating, twin screw extrusion apparatus. The invention is particularly directed to the extrusion of honeycomb structures wherein the batch consists of cordierite or cordierite-mullite compositions with water and a hydroxypropyl cellulose binder/plasticizer having a viscosity at 20° C. in a 2% aqueous solution between 25,000–100,000 centipoises. Preferably, the hydroxypropyl cellulose will have a viscosity of at least 50,000 centipoises such as to permit a working temperature during operation of the extrusion apparatus of at least 40° C.

12 Claims, 11 Drawing Figures

PROCESS FOR MIXING AND EXTRUDING CERAMIC MATERIALS

BACKGROUND OF THE INVENTION

One method for forming shapes of ceramic materials which has been widely practiced involves extruding a stiff plastic mix through a die orifice. This technique has been commonly used in forming brick, dinnerware, sewer pipe, hollow tile, electrical insulators, and other articles having an axis normal to a fixed cross section. Most generally, a two-stage vacuum de-airing auger has been utilized to remove air bubbles. The bath is thoroughly mixed with water and forced through a die.

More recently, ceramic honeycomb-shaped products, which are composed of a multitude of cells or passages separated by thin walls running parallel to the longitudinal axis of the structure, have been formed through extrusion. Such articles have seen extensive service as filters for fluids, both liquids and gases, and as heat exchangers. Within the past decade the walls of those structures have been coated with a catalyst capable of converting the noxious fumes from the discharge gases of internal combustion engines and wood and coal burning stoves into harmless emissions. It is apparent that the environments in those latter applications require that the structures satisfy a stringent matrix of chemical and physical properties. To illustrate, the mechanical strength thereof must be sufficiently great to resist the mechanical forces necessarily inherent in positioning and mounting the structure in the assembly and the vibrations, gas pressures, and other physical abuse experienced in use. The structures must also manifest high refractoriness, high thermal shock resistace, high resistance to abrasion from particles in the gaseous fumes, and high resistance to chemical attack from the fumes.

Various materials have been investigated for their utility as cellular substrates for catalyst-coated honeycomb structures fashioned via extrusion. That experimentation has included bodies prepared from such materials as alumina-silica, alumina, zirconia-alumina, zirconia-magnesia, mullite, zircon, zircon-mullite, titania, spinel, zirconia, $Si_3N_4$, and carbon. Of all the compositions tested, however, only two have been used commercially to any substantial extent, viz., cordierite ($2MgO.2Al_2O_3.5SiO_2$) and beta-spodumene solid solution ($Li_2O.Al_2O_3.2-8SiO_2$). And, because the use temperature of beta-spodumene is so low (<1200° C.), its utility for this application is quite restricted. Therefore, cordierite, occasionally combined with a compatible refractory phase, such as mullite ($3Al_2O_3.2SiO_2$), has comprised the principal material for extrusion as cellular substrates in catalytic converter assemblies designed for use with wood and coal burning stoves and internal combustion engines.

The present invention is concerned with the extrusion of a plastic ceramic batch into articles of widely-differing profiles and shapes such as, for example, dinnerware and electrical insulators, and especially with the extrusion of thin-walled honeycomb structures from ceramic batches capable of flowing or plastically deforming under pressure during extrusion, but which have the ability to maintain their as-extruded form under ambient conditions after being relieved of the high extrusion shear forces. More specifically, the present invention relates to an apparatus and an improved method for homogenizing ceramic batch materials and extruding them into bodies of various geometries and particularly into cellular substrates.

A typical method currently being utilized for extruding cellular substrates has contemplated the following overall steps:

(1) the batch components are dry mixed together;

(2) water is added and the wet batch thoroughly mixed;

(3) the wet batch is fed to a two-stage, single screw auger system, wherein the first stage compacts and forces the batch through a chip or spaghetti die into a vacuum de-airing chamber, and the second compacts the chips or spaghetti material into billets; and (4) the billets are ram pressed through a die having the proper configuration to yield honeycomb substrates of a desired structure.

Customarily, a screen will be placed in front of the die to remove any large tramp particles that could injure the die walls or block the orifices in the die.

In general, the batch will comprise a major portion of finely-divided ceramic material, e.g., cordierite with or without mullite, about 1-7%, preferably about 2-5%, of an organic binder/plasticizer, and, optionally, up to about 1% of an extrusion aid. The organic binder/plasticizer exerts a profound effect upon the extrusion properties of the batch, the rate of throughput of material passing the die, and the wet or green strength of the extruded article. The plasticity developed in the batch is strongly dependent upon the rheological characteristics of the binder/plasticizer. Plasticity has been generally defined as that property which enables a material to be deformed without rupture during the application of a stress that exceeds the yield value of the material.

As the ceramic batch is mixed, it develops the plasticity which permits it to be extruded and to retain its geometry after extrusion. The temperature of the batch increases during mixing (this is especially true where shear mixing is employed) because of the energy put into the system. Many organic binders/plasticizers for use with ceramic batches have been investigated including alginates, polyethylene oxides, resins, starches, and waxes. Experience has shown that, commonly, such materials have resulted in the batch softening continuously (the viscosity decreases) as the temperature rises. That phenomenon yields lower extrusion pressures but also, disadvantageously, leads to a loss of shape and reduction of green strength in the extruded substrate.

With certain cellulosic binders there is a slight softening of the batch as the temperature increases, but at a certain characteristic point the system begins to gel, thereby effecting a sharp rise in viscosity. Gelation of the batch can impart improved wet strength to the extruded batch and enhanced retention of strength. The principal, commercially-marketed water soluble cellulose compound utilized for cellular ceramics that demonstrates this desirable behavior is methyl cellulose. When dissolved in water and heated, that methyl ether polymer forms a gel, but returns to a liquid solution when cooled. A typical viscosity-temperature curve for an aqueous methyl cellulose solution is illustrated in FIG. 1, which reports the gelation of a 2% aqueous solution of a methyl cellulose having a nominal viscosity of 100 mPa.s when heated at 0.25° C./minute. The rate of shear is $86s^{-1}$.

As can be observed in FIG. 1, the viscosity of the solution falls as the temperature is raised until the incipient gelation temperature is attained, at which point there is a dramatic increase in viscosity upon further heating. During cooling, the gel reverts to a liquid and exhibits the properties of the original solution.

FIG. 2 illustrates the typical behavior of ceramic batches containing methyl cellulose as the binder/plasticizer expressed in terms of apparent viscosity as a function of temperature. As the temperature of the gelled ceramic batch is raised, for example, during shear mixing, a point is reached whereat the batch loses its plasticity and becomes separated into discrete granular particles. At that point the ceramic batch can no longer be extruded into a cellular substrate. The temperature of that point controls the rate at which the batch can be extruded and, consequently, the throughput of the extrusion. In general, the higher the temperature that can be utilized, the more rapid will be the rate of extrusion.

Because the cell walls of the desired honeycomb substrate are very thin and, hence, readily susceptible to distortion, the batch therefor is kept at a high viscosity. As currently practiced, the wet batch is commonly mixed in a muller-type mixer and, because the time for mixing is held as brief as possible commensurate with good mixing, little work is done on the batch. FIG. 3 is a diagrammatic sketch portraying the viscosity curve as a function of work with time as measured on a plastograph. As can be seen there, the viscosity of the batch initially rises sharply as work is applied thereto, but it passes through a maximum and levels out to a generally equilibrium viscosity, the temperature of the mix being maintained relatively constant.

For the cordierite and cordierite-mullite batches currently employed for the extrusion of cellular substrates, and wherein methyl cellulose comprises the organic binder/plasticizer, a mulling time of only a few minutes has been found satisfactory to insure good mixing. The narrow interval AB represents the viscosity of the batch following that mixing. Maintenance of that limited window of operable viscosities on a rapidly changing portion of the viscosity curve is, however, affected by several variables; e.g., batch temperature, water temperature, water content, time after mulling, augering (extrusion) of billets, and final extrusion. Also, the viscosity of the mixed batch can change with time as the methyl cellulose continues to hydrate with time. Accordingly, the level of work on the batch is non-uniform throughout the process. Even more critically, the viscosity of the batch can vary across the diameter of an extruded billet.

One method for solving this problem is to mix or work the batch for a sufficient length of time such that the viscosity reaches the relatively flat portion of the curve, i.e., the viscosity approaches an equilibrium, through much extended mixing times. However, to achieve the necessary batch viscosity for extruding the desired cellular substrates would require a batch exhibiting a viscosity curve as described in FIG. 4. Thus, as is depicted in the new curve, the overall viscosity range of the batch must be moved upward (more viscous), such that the equilibrium viscosity is that desired for extrusion.

It is apparent that increased viscosity of the batch can be secured by reducing the water content and/or raising the temperature of the batch. The latter alternative, however, hazards the loss of plasticity of the batch. The former option demands extended mixing times which are unattractive from a practical point of view.

Therefore, a primary objective of this invention is to devise means for putting a great amount of work into the batch in a short period of time and in a uniform manner. Such would exert the same effect as an extended mixing time in a low shear mixer.

A second objective is to devise an organic binder/plasticizer exhibiting the gelation capability of methyl cellulose but operable at higher temperatures.

As has been explained above, billets of the ceramic batch are currently extruded utilizing a single-screw, two-stage auger system. In the first stage the auger picks up the batch and compacts it against an element having apertures therein. As the batch is forced through those holes into a vacuum chamber, it is transformed into chips or into the form of noodles or spaghetti. The compacted material provides a vacuum seal so that air can be readily removed from the batch in the attenuated or shredded state. In the second stage the auger picks up the de-aired material, compacts it into a transition zone to make a billet larger than the auger chamber, and then forces it against a die for extrusion into a billet.

In the current process for forming cellular substrates, the billet, as prepared above, is ram pressed through a die having the proper configuration to yield the desired cellular product. A defect, termed auger spot, has been observed in the center portion of the cellular substrates which has been traced to inhomogeneity of the billet from the auger.

The primary function of the auger is to de-air and compact the batch material and apply pressure thereto. For the most part the material travels through the barrel of the extrusion apparatus as a plug. The material in actual contact with the core and flights of the screw experiences considerable shear when compared to the bulk of the material. And to a lesser degree, the material in contact with the wall of the barrel is subject to more shear than the bulk. As a result, those regions evidence a decrease in viscosity or stiffness because of the added work being applied thereto (FIG. 3). As a consequence, when the material moves beyond the tip of the screw, the material in actual contact with and closely adjacent to the screw collapses to the center of the billet. That phenomenon creates a soft spot in the billet which, when the billet is extruded through the honeycomb die, flows more easily through the die. That action results in the webs in the center of the extruded product being thicker-walled and, in some instances, the channels have been completely filled. The swollen webs impart a shadow effect which is readiy visible in the extruded body. As can easily be appreciated, careful control of auger spot, i.e., inhomogeneous stiffness across the billet, must be exercised in order to prevent loss of ware because of excessively swollen webs in the extruded substrate.

This auger spot must be distinguished from the discoloration occasionally observed which is the result of metal wear of the auger screw. The metallic particles by themselves appear to exert no adverse effect upon the final product.

GENERAL DESCRIPTION OF THE INVENTION

Figure 1:
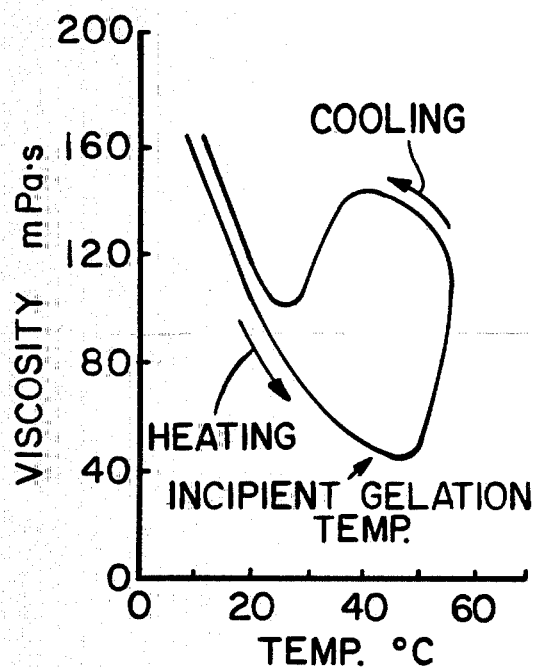
FIG. 1 comprises a typical viscosity-temperature curve for an aqueous methyl cellulose solution.
Figure 2:
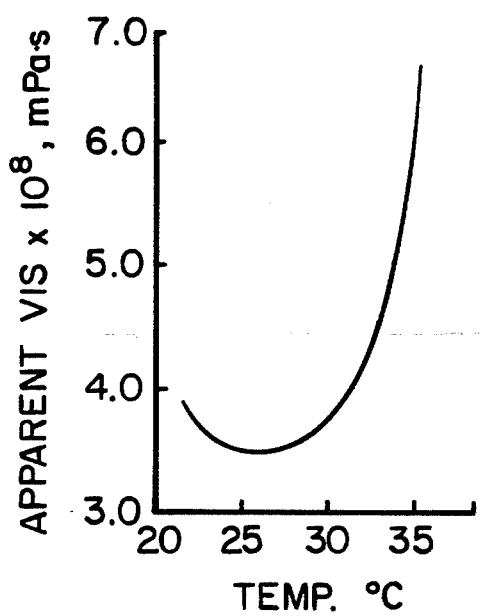
FIG. 2 constitutes a typical viscosity-temperature curve for ceramic batches containing methyl cellulose as the binder/plasticizer.
Figure 3:
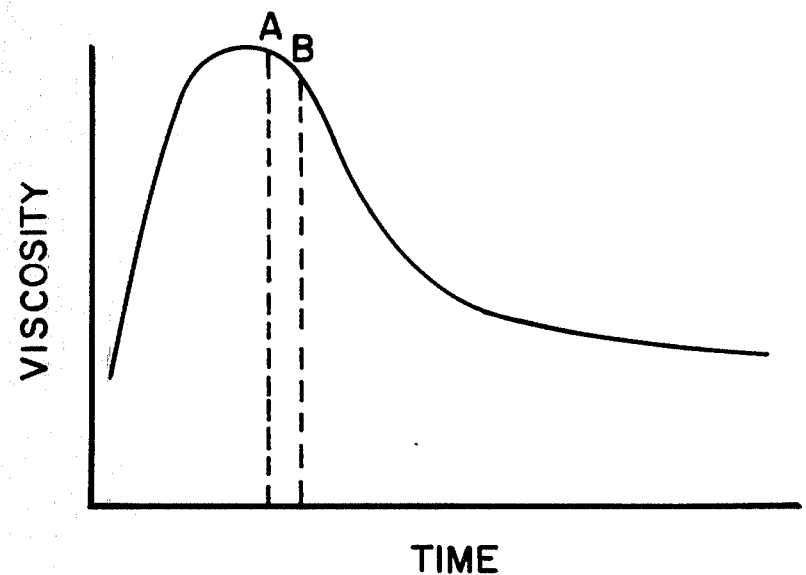
FIG. 3 consists of a diagrammatic sketch of the viscosity curve as a function of work applied to a ceramic batch with time.

We have found that the primary objective of this invention, viz., to devise means for impressing a great amount of work into a ceramic batch in a short period of time and in a uniform manner, which batch is to be extruded into articles of widely-differing profiles and shapes, can be accomplished through the use of a twin screw extrusion apparatus. In the main, the screws are designed to be self-cleaning, intermeshing, and co-rotating. However, where greater compaction of the batch is desired, for example, to promote improved vacuum sealing and de-airing, segments of different pitch and/or reverse pitch screws may be included in the apparatus. Counter-rotating screws can generate higher pressures than co-rotating screws, but generally provide poorer mixing. The screws will customarily have flights or turns along their length which are tailored in pitch and profile to provide for kneading, mixing, and conveying of the batch. Self-cleaning screws are highly advantageous to prevent the batch from adhering to the screw root. Inhomogeneities in the extruded billet or final substrate produced because of non-uniform residence time distribution or lack of good intermixing are very rare with the twin screw apparatus, because of the extensive interblending and repeated folding of the batch across the barrel of the apparatus effected by the interaction of the intermeshing screws. The co-rotating screws are so designed that one crest edge of one screw wipes the flanks of the other screw with a tangentially-oriented, constant, relative velocity. Because of the high relative velocity in co-rotating screws, there is sufficient shear velocity to wipe the boundary layers in a uniform self-cleaning action.

The twin screw extruding apparatus utilizes tight tolerances and clearances such that a very intensive mixing action results. In so doing, the time required for mixing is dramatically reduced. However, because of the close tolerances present in intermeshing twin screws, a large amount of mechanical energy is put into the batch being mixed and conveyed leading to the generation of heat therein.

Twin screw apparati have been employed in the plastic industry, illustrations of such activity being found in U.S. Pat. Nos. 3,749,375, 3,856,278, and 4,299.499.

However, those apparati have not seen service with ceramic batch systems for a number of reasons. For example:

The pressures required for mixing and extruding ceramic batches are much greater than are utilized in the plastics industry. The ceramic batch for a honeycomb substrate must be quite stiff to resist deformation of the extruded green shape.

Because of the pressures developed and because of the very nature of a ceramic batch, the abrasion of the screws is much more severe than is experienced in the extrusion of plastics.

And, most importantly, because of the pressures generated, with a concomitant great level of mechanical energy put into the batch, a very considerable amount of heat is produced, which heat adversely affects the water and organic binder chemistries of the batch system. Complex and costly cooling devices have been designed in attemps to control the batch temperature.

As has been explained above, where a gel-type binder/plasticizer, such as water soluble cellulose compounds, is employed with ceramic batches, the temperature at which gelation occurs governs the rate at which the batch can be extruded. Hence, for an extrusion apparatus to promote the greater throughput possible with a twin screw extruder, gelation temperatures higher than those exhibited by the commercial methyl cellulose binders/plasticizers utilized in the conventional single screw (auger) extruder would be necessary. Thus, for example A4M METHOCEL® (a methyl cellulose having a viscosity of 4000 centipoises at 20° C. is a 2% aqueous solution, as measured through the use of Ubbelohde tubes, marketed by Dow Chemical Corp., Midland, Mich.), when used with ceramic batches causes the plasticity thereof to be lost at about 30° C. In order to develop desirable binder/plasticizers which would allow operation at higher temperatures, a laboratory program was devised founded upon two determinations; viz., a measurement of the cohesiveness of a ceramic batch and a measurement of batch stiffness.

Figure 5:
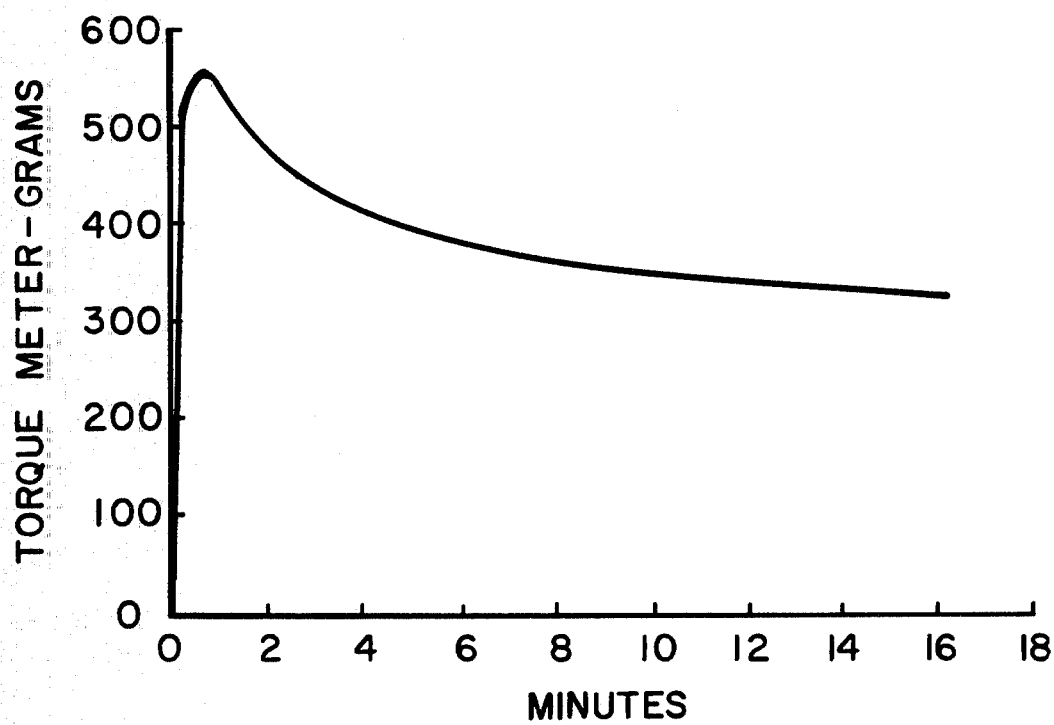
FIG. 5 illustrates a typical torque rheometer curve for a cordierite or cordierite-mullite batch used in the production of honeycomb substrates.

A torque rheometer is employed to measure batch cohesiveness. A ceramic batch is placed in a bowl and the torque developed when the batch is sheared between two blades measured. The level of shear in the system can be varied by altering the configuration of the blades and/or the speed at which the blades are rotated. A typical torque rheometer curve for a cordierite or cordierite-mullite batch for honeycomb substrates, using a cam blade, is depicted in FIG. 5. Data with respect to batch plasticity, thixotropy, and cohesiveness can be gleaned from that curve. Extensive experimentation evidenced that good correlations with extrusion capability were achieved when the rheometer was operated at a low shear level [sigma blades rotating at 20 revolutions per minute (RPM)]. In a typical test, the batch ingredients were compounded, dry blended together, the batch weighed, an appropriate quantity of water added thereto, the wet batch mixed by hand, charged into the rheometer, and then sheared at a preselected temperature.

Figure 6:
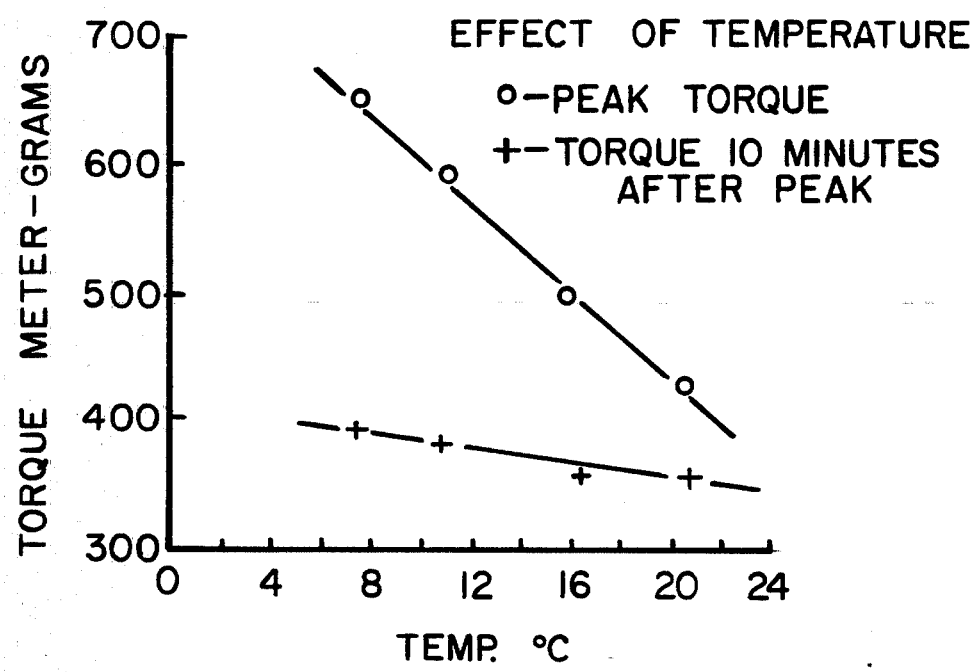
FIG. 6 plots peak torque as a function of temperature for a cordierite or cordierite-mullite batch containing a methyl cellulose as the binder/plasticizer.

FIG. 6 illustrates that when peak torque is plotted against temperature for a cordierite or cordierite-mullite batch containing the above-described A4M METHOCEL® binder/plasticizer, the loss of plasticity with increasing temperature is all too evident. Such large changes in batch properties for small variations in temperature are not desirable.

Figure 7:
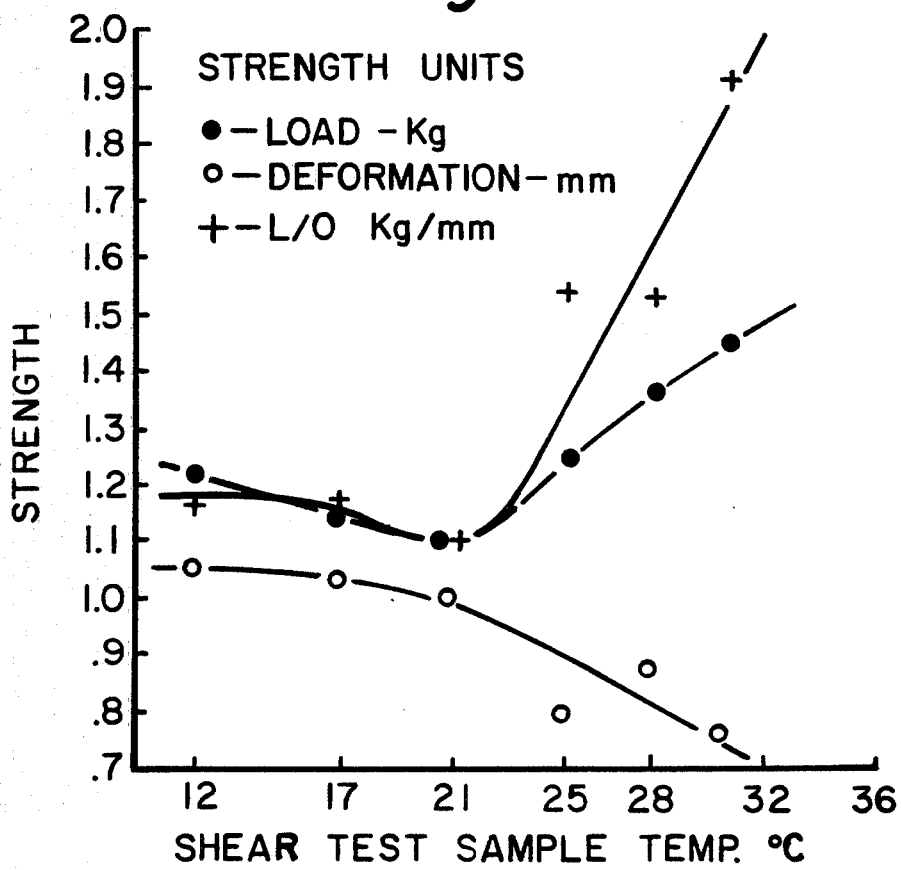
FIG. 7 comprises curves resulting from plotting the force required to shear a ceramic ribbon and the deformation of that ribbon at the point of shear against temperature.

A shear test is employed to measure batch stiffness. In the shear test a wet-mixed batch is initially extruded into a ribbon and a small sample of that ribbon is subjected to a unidirectional shear force. The force required to shear the ribbon and the deformation suffered by the ribbon at the point are measures of the stiffness of the batch. FIG. 7 reports that curve resulting from plotting those two values against the temperature at which the test is carried out. That curve, generated by a cordierite-mullite batch containing the above-described A4M METHOCEL ® binder/plasticizer, clearly exhibits the substantial change in batch stiffness with increasing temperatures. The low temperature at which that action occurs is quite undesirable for extrusion in a twin screw apparatus.

Numerous binder systems were investigated to locate any having a higher working temperature and demonstrating reduced sensitivity to change over the range of working temperature than does the commercially-available methyl cellulose. Such included starches and higher molecular weight derivatives of methyl cellulose, viz., hydroxyethyl cellulose, hydroxypropyl cellulose, hydroxyethyl methyl cellulose, hydroxypropyl methyl cellulose, and hydroxybutyl cellulose. Only the methyl cellulose derivatives manifested the desired behavior.

Figure 8:
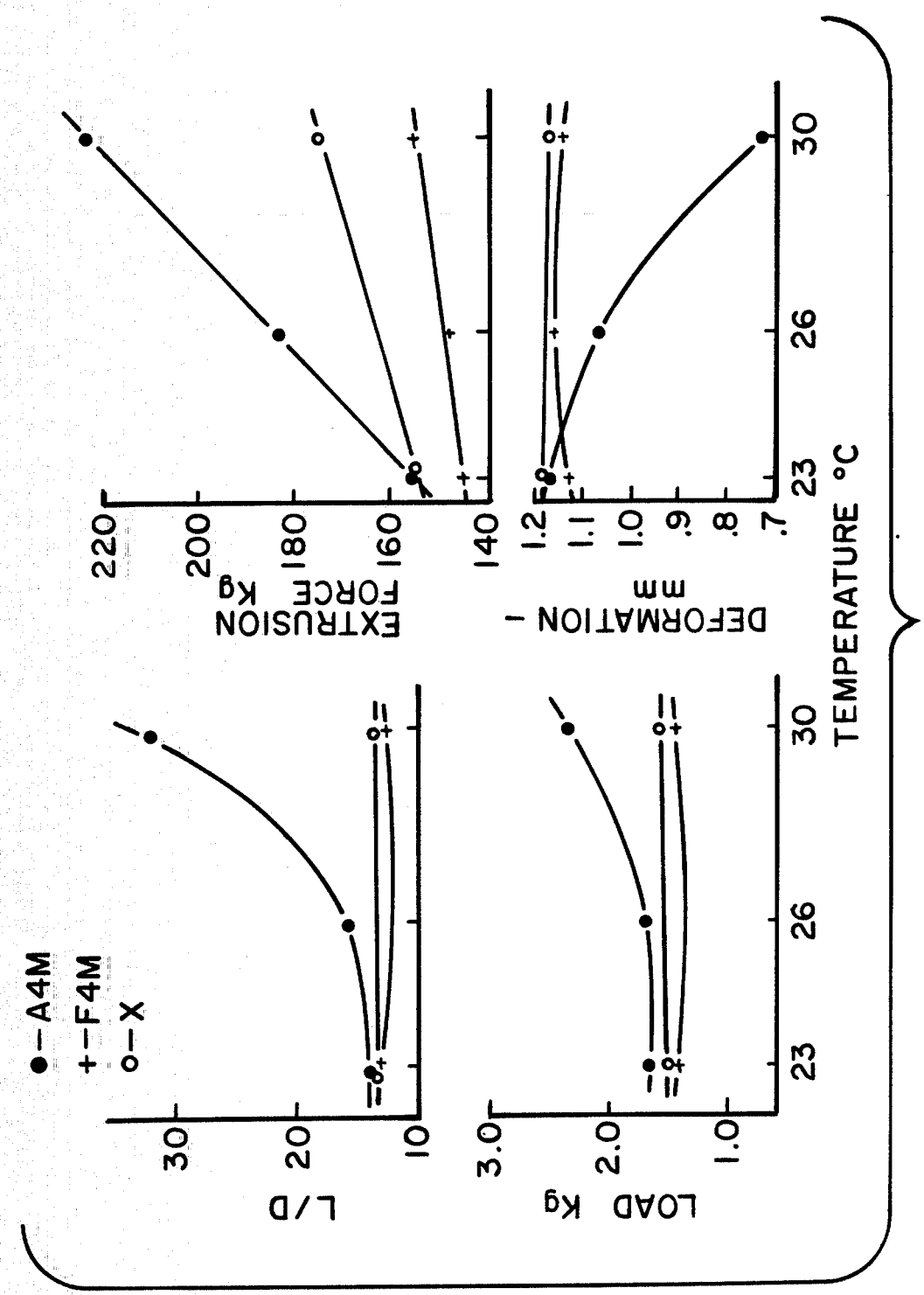
FIG. 8 reports plots of shear test data utilizing a cordierite-type batch with various binder/plasticizers.
Figure 9:
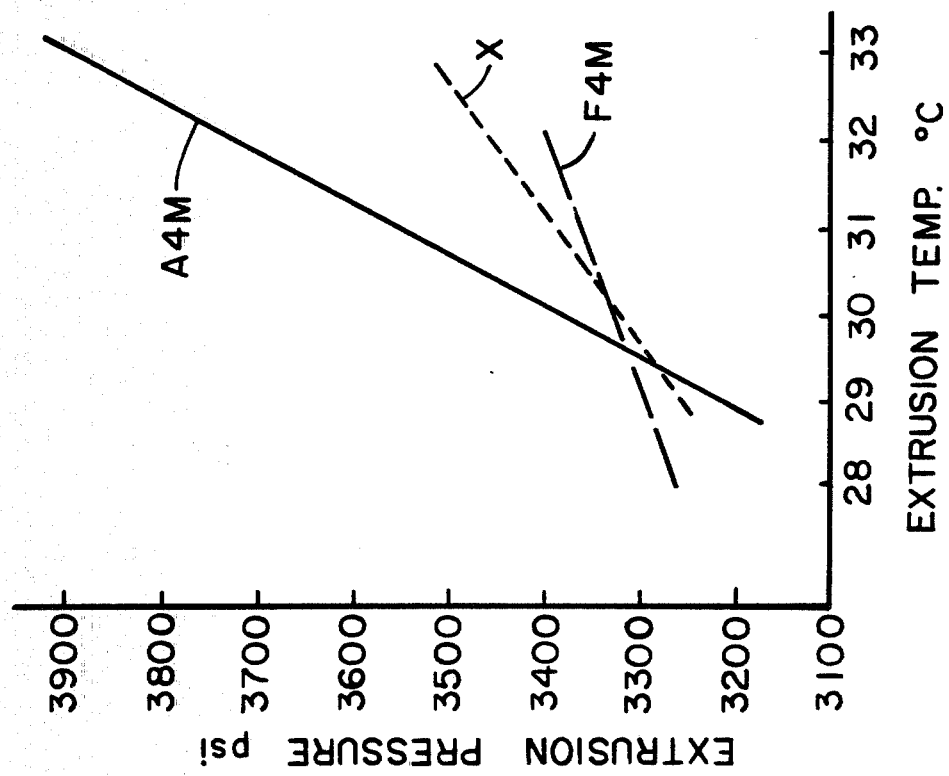
FIG. 9 consists of extrusion pressure-temperature curves exhibited by cordierite-type batches containing various binder/plasticizers.

FIG. 8 illustrates comparisons between the commercially-marketed A4M METHOCEL® and two hydroxypropyl celluloses (F4M, marketed by Dow Chemical Corp., and an experimental composition X) utilized in the standard cordierite-type batch at temperatures up to 30° C. The shear test data indicate very little response for the hydroxypropyl celluloses over the temperature range of 23°-30° C., whereas the methyl cellulose demonstrates a very large change. Those data were confirmed in the actual extrusion trials reported in FIG. 9 utilizing increasing temperatures. Hence, the sharp rise in extrusion pressure with increasing temperature evidenced with the methyl cellulose batch is contrary to the goal of utilizing higher extrusion temperatures.

F4M hydroxypropyl cellulose has a viscosity of about 4000 centipoises at 20° C. in a 2% aqueous solution and composition X a viscosity of about 60,000 centipoises at 20° C. in a 2% aqueous solution, as measured via Ubbelohde tubes. The F4M material is self-evidently a significant improvement over the A4M methyl cellulose, but would not plasticize the batch in the torque rheometer at 40° C. Interestingly, the higher viscosity composition X provided a plasticized batch at temperatures of 40° C. and somewhat above.

Based upon those experiments, screening tests were conducted wherein billets were made from the standard cordierite-type mix utilizing the three binders in the twin screw apparatus. Those billets were then ram extruded in the conventional manner to form honeycomb substrates, and those substrates examined critically for skin quality and air checks. No attempt was exerted to maximize throughput; the objective was to prepare good billets with the twin screw apparatus, so that the final extruded ware could be compared.

The results of those tests are listed in Table I below. In the rating system 1 designates the best and 5 the worst. A billet prepared via the conventional auger single screw process utilizing the A4M binder/plasticizer is included for comparison. The billets were prepared at 17°-20° C. with a water content of 30.5% by weight. In the Table, $\bar{x}$ represents mean and $\sigma$ signifies standard deviation. Two sets of billets were produced which were then ram extruded through two different steel dies (A and B). Die A consisted of about 400 parallel passages per square inch and Die B was composed of about 100 parallel passages per square inch.

TABLE I

|  | Auger | A4M | F4M | X |
|---|---|---|---|---|
| Die A |  |  |  |  |
| Skin $\bar{x}$ | 4.43 | 3.56 | 3.06 | 2.37 |
| $\sigma$ | 0.65 | 0.96 | 1.19 | 0.50 |
| Air $\bar{x}$ | 2.93 | 2.5 | 1.76 | 1.44 |
| Check $\sigma$ | 1.00 | 0.82 | 0.75 | 0.73 |
| Die B |  |  |  |  |
| Skin $\bar{x}$ | 2.81 | 1.89 | 1.85 | 1.13 |
| $\sigma$ | 1.64 | 1.18 | 0.66 | 0.34 |
| Air $\bar{x}$ | 2.38 | 2.28 | 2.50 | 1.50 |
| Check $\sigma$ | 1.20 | 0.46 | 0.52 | 0.97 |

The higher viscosity binders/plasticizers performed better in those tests and X was clearly superior when the amount of ware acceptable for production purposes was compared in Table II. Table II reports the wet skin rating of the extruded substrate expressed in terms of the percentage of footage with a 1 or 2 rating at three foot intervals.

TABLE II

|  | Auger | A4M | F4M | X |
|---|---|---|---|---|
| Die A | 0 | 0 | 47 | 63 |
| Die B | 37.5 | 72 | 86 | 100 |

The higher viscosity X has a higher working temperature (45° C. as compared with about 30° C. for A4M) which enables a higher throughput of batch in the twin screw apparatus. Laboratory experience has indicated that, when compared with A4M, X exhibits less variability over the working temperature ranges; it demonstrates a lower extrusion pressure for a given temperature; it can be used in lower concentrations for similar viscosities; it gives more flexibility in mixing batch; and it appears to impart better wet strength and shape retention to a ceramic body.

Figure 11:
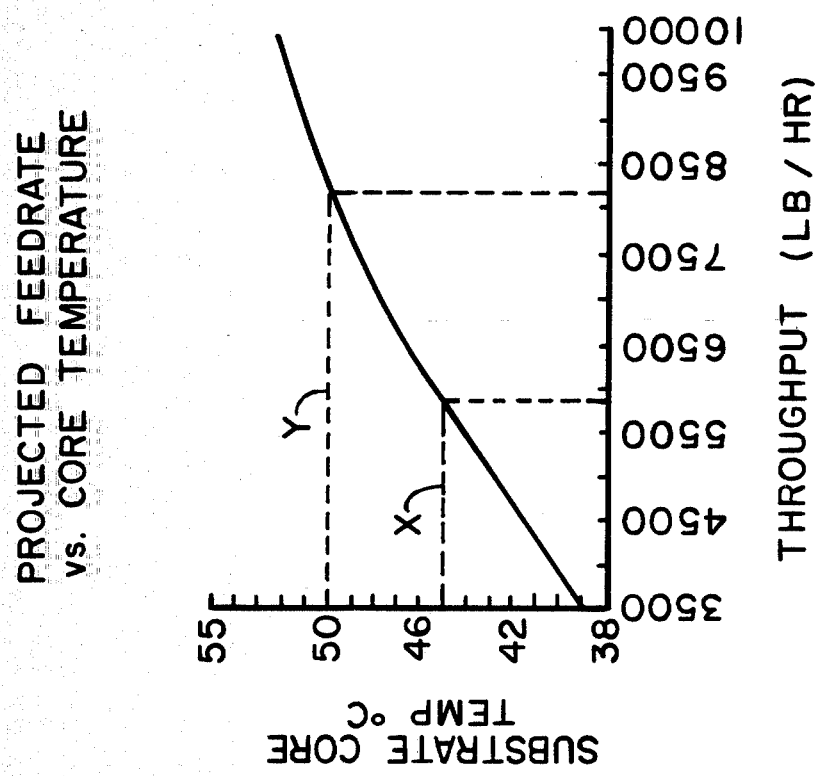
FIG. 11 comprises a curve illustrating the throughput of a cordierite-type batch as a function of temperature.
Figure 10:
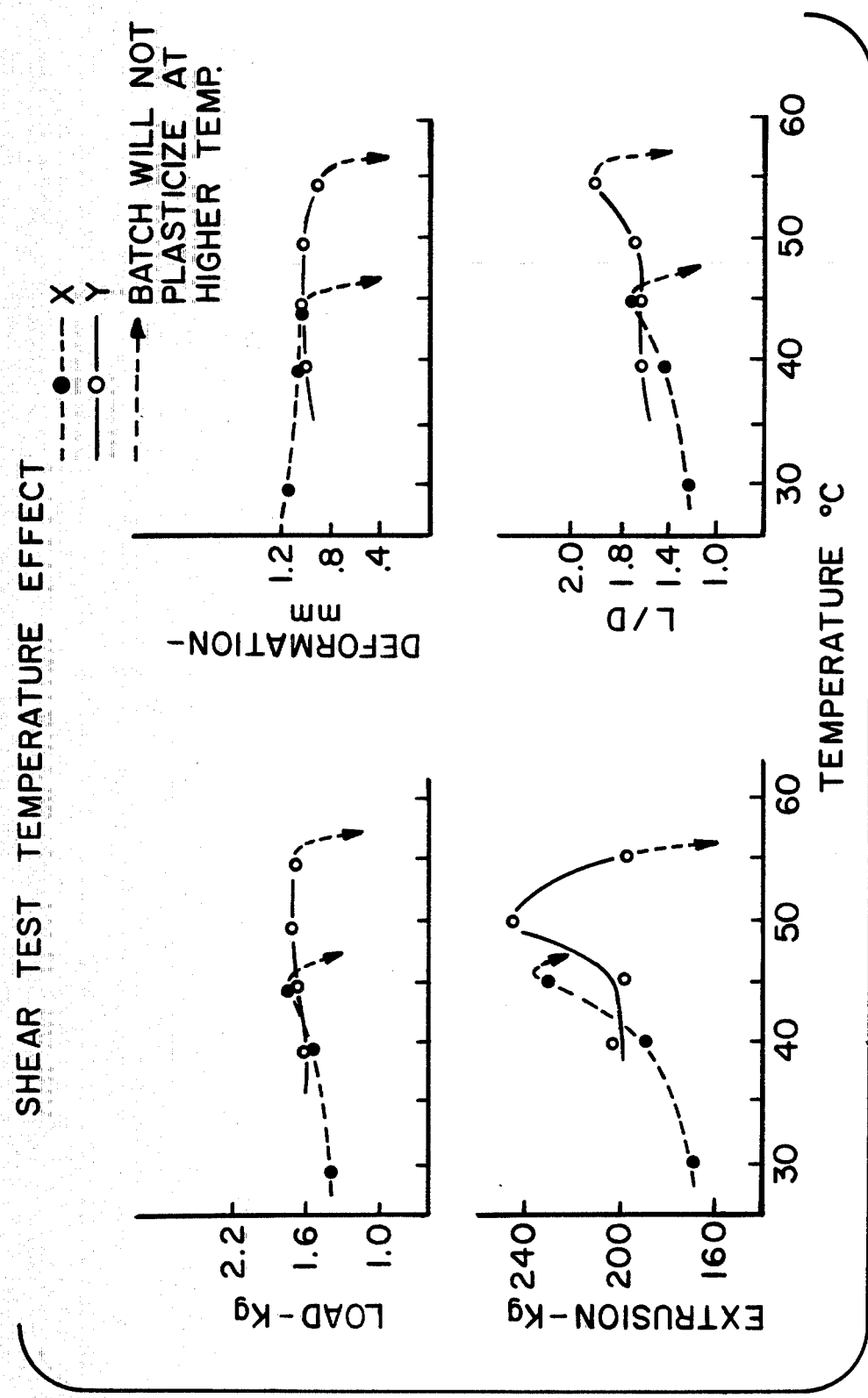
FIG. 10 constitutes plots of shear test data at various temperatures demonstrated by cordierite-type batches containing two different binder/plasticizers.

The desire for binders/plasticizers manifesting even higher working temperatures has led to a hydroxypropyl cellulose with a greater hydroxypropyl content and viscosity, viz., an experimental composition Y. This material, having a viscosity of about 75,000 centipoises at 20° in a 2% aqueous solution, as measured via Ubbelohde tubes, can be plasticized in the torque rheometer at temperatures about 50° C. (FIG. 10), and has been employed in the twin screw extrusion apparatus at a core temperature of 50° C. Although that value is only about 5° C. above the upper temperature limit for X, it has been projected that the throughput of a twin screw apparatus can be increased by about 25% thereby (FIG. 11).

In view of the above studies, it has been determined that the binder/plasticizer for use in extruding ceramic batches into articles of widely-varying profiles and shapes, such as to permit the use of working temperatures greater than 35° C. in a twin screw extrusion apparatus, should have a viscosity between 25,000-100,000 centipoises. Whereas, when cordierite-type batches are to be extruded into such complex shapes as honeycomb matrices for use in catalytic converter substrates, diesel particulate filters, heat exchangers, and molten metal filters, a binder/plasticizer having a viscosity of 25,000 centipoises will be operable, a viscosity of at least 50,000 centipoises is much preferred since it allows the use of working temperatures of at least 40° C. And, as has been demonstrated above, hydroxypropyl celluloses having viscosities of approximately 75,000 centipoises enable working temperatures of 50° C. to be used in a twin screw apparatus. Viscosities greater than about 100,000 centipoises require extremely high pressures with the concomitant generation of much heat, that heat adversely affecting the rheology of the batch.

The existing commercial process of forming extruded honeycomb substrates, as described above, is an intermittent as opposed to a continuous process. In short, a wet batch is fed into a two-stage, single screw auger system to form billets and those billets are thereafter ram pressed through a die. One serious problem is inherent to that process, besides the obvious loss of time and the need for added labor in using two apparati. A plug or portion of each billet is left behind the die and in the end of the barrel after each push of the ram. This residue forms an interface with the next billet. As that interface is extruded through the die into substrate, it creates a flaw, especially at the cellular substrate surface. Because of the intrinsic flow characteristics of the ceramic material, the interface elongates in a parabolic shape as it moves through the die such that several feet of substrate are affected thereby, resulting in considerable unacceptable ware.

Figure 4:
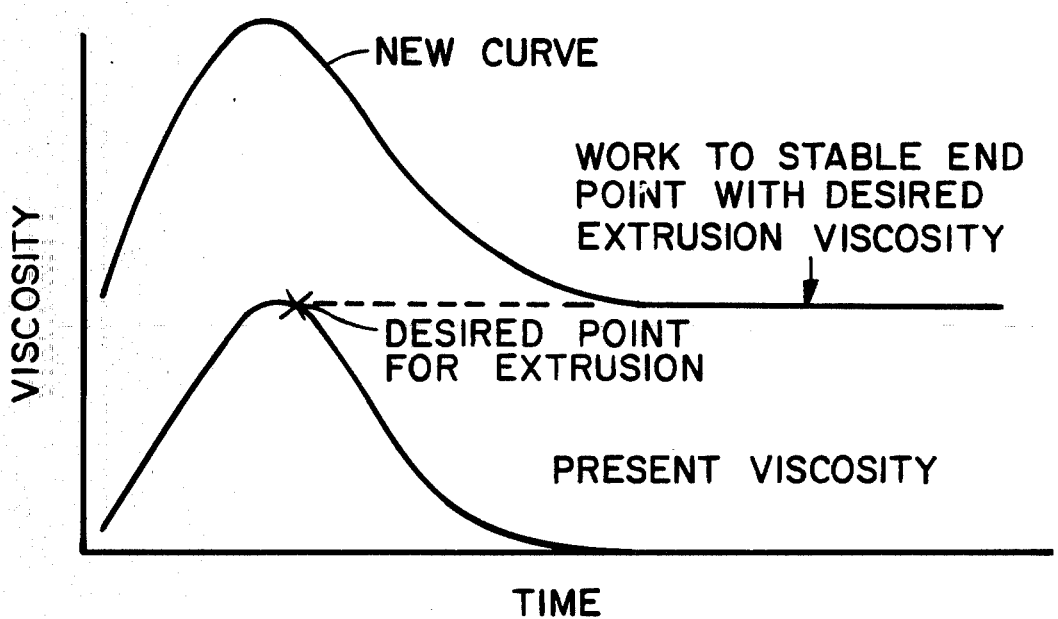
FIG. 4 depicts diagrammatically two viscosity curves as a function of work applied to a ceramic batch with time.

The twin screw apparatus, because of the higher pressures, not currently possible with the conventional single screw auger commonly used commercially in extruding most ceramic materials, and improved mixing capability, offers a continuous process. Thus, the wet batch is charged into the twin screw apparatus which mixes the ingredients and, in so doing, applies a lot of work to the batch. And, because of the use of high viscosity hydroxypropyl cellulose binders/plasticizers, higher temperatures, with concomitant higher batch viscosities, can be utilized. This feature moves the viscosity curve upward, as described in FIG. 4, such that extrusion can be undertaken at a viscosity closer to an equilibrium viscosity. The mixed batch, after de-airing, is then passed through a screen (to protect the die) and thence through the die, exiting as a finished honeycomb substrate. (In order to eliminate work stoppages to replace plugged screens and/or worn dies, an automatic screen and die changer may be utilized to make such changes without shutting down the extrusion apparatus.)

In a preferred embodiment, the overall ceramic composition will consist essentially of cordierite with a minor amount of mullite. In general, the precursor batch will contain about 1-4% by weight hydroxypropyl cellulose, and, optionally, up to about 1% of an extrusion aid. A particular batch therefor is recited below in parts by weight:

Talc: 40.21
Alumina: 13.47
Hydroxypropyl Cellulose: 3.0
Diglycol Stearate: 1.0
Kaolin: 46.32

The diglycol stearate functions as an extrusion aid. Other commercially-available extrusion aids may, of course, be used in conjunction with or in substitution for diglycol stearate. Water in an amount of about 31% as a percentge of dry solids is added to the batch ingredients.

We claim:

1. In the method for making ceramic articles of widely-differing profiles and shapes by providing a plastically-deformable batch comprising a mixture of particulate ceramic material, water, a binder/plasticizer, and, an extrusion aid, charging the batch into an extrusion apparatus to mix, de-air, convey, and force the batch through a die having a desired configuration, the improvement which comprises including a gel-type binder/plasticizer having a viscosity at 20° C. between 25,000-100,000 centipoises in said batch and utilizing a twin screw extrusion apparatus wherein the screws of said apparatus are self-cleaning, intermeshing, and co-rotating to mix, de-air, convey, and force the batch through a die at working temperatures greater than 35° C.

2. The method of claim 1 wherein said batch contains a hydroxypropyl cellulose having a viscosity at 20° C. in a 2% aqueous solution between 25,000–100,000 centipoises as said binder/plasticizer.

3. The method of claim 1 wherein said hydroxypropyl cellulose is present in said batch in an amount of about 1–4% by weight.

4. The method of claim 1 wherein said ceramic articles consist essentially of cordierite or cordierite-mullite compositions.

5. The method of claim 1 wherein said ceramic articles are billets for further extrusion or blanks for shapes having an axis normal to a fixed cross section selected from the group consisting of electrical insulators, hollow-tile, sewer pipe, and dinnerware.

6. The method for making a honeycomb structure consisting of a cordierite or cordierite-mullite composition which comprises the steps of:
  (a) providing a batch consisting of a mixture of particulate ceramic material, water, a hydroxypropyl cellulose having a viscosity at 20° C. in a 2% aqueous solution between 25,000–100,000 centipoises, and, an extrusion aid;
  (b) charging said batch into a self-cleaning, intermeshing, ad co-rotating twin screw extrusion apparatus;
  (c) operating said extrusion apparatus at working temperatures greater than 35° C. to knead, mix, de-air, and convey said patch; and then
  (d) passing said batch through a die to produce a honeycomb structure.

7. A method according to claim 6 wherein said hydroxypropyl cellulose is present in an amount of about 1–4% by weight.

8. A method according to claim 6 wherein said hydroxypropyl cellulose has a viscosity at 20° C. in a 2% aqueous solution of at least 50,000 centipoises and said working temperature is at least 40° C.

9. A method according to claim 6 wherein said hydroxypropyl cellulose has a viscosity at 20° C. in a 2% aqueous solution of about 75,000 centipoises and said working temperature is about 50° C.

10. A method according to claim 6 wherein said honeycomb structure comprises a filter selected from the group consisting of a diesel particulate filter and a molten metal filter.

11. A method according to claim 6 wherein said honeycomb structure comprises a substrate for a catalytic converter means for use with internal combustion engines and coal and wood burning stoves.

12. The method of claim 1 wherein said die has a configuration to form a honeycomb structure such that forcing said batch through said die produces a ceramic honeycomb structure.

* * * * *